United States Patent
Ben Nun et al.

(10) Patent No.: US 6,831,893 B1
(45) Date of Patent: Dec. 14, 2004

(54) APPARATUS AND METHOD FOR WIRE-SPEED CLASSIFICATION AND PRE-PROCESSING OF DATA PACKETS IN A FULL DUPLEX NETWORK

(75) Inventors: Michael Ben Nun, Ramat Hasharon (IL); Sagi Ravid, Zichron Yakov (IL); Ofer Weil, Aderet (IL)

(73) Assignee: P-Cube, Ltd., Herzelia (IL)

( * ) Notice: Subject to any disclaimer, the term of this patent is extended or adjusted under 35 U.S.C. 154(b) by 0 days.

(21) Appl. No.: 09/541,598

(22) Filed: Apr. 3, 2000

(51) Int. Cl.⁷ .............................................. G08C 15/00
(52) U.S. Cl. ..................... 370/235; 370/229; 370/389; 370/400; 370/411; 370/230
(58) Field of Search ................................ 370/229, 230, 370/230.1, 235, 252, 320, 389–392, 400–402, 411–418

(56) References Cited

U.S. PATENT DOCUMENTS

| | | | |
|---|---|---|---|
| 5,617,421 A | * 4/1997 | Chin et al. | 370/402 |
| 5,806,086 A | 9/1998 | Kimmel et al. | 711/145 |
| 5,842,040 A | * 11/1998 | Hughes et al. | 710/11 |
| 5,898,837 A | 4/1999 | Guttman et al. | 709/224 |
| 5,946,302 A | 8/1999 | Waclawsky et al. | 370/252 |
| 5,956,721 A | 9/1999 | Douceur et al. | 707/10 |
| 5,995,488 A | 11/1999 | Kalkunte et al. | 370/232 |
| 5,995,971 A | 11/1999 | Douceur et al. | 707/102 |
| 6,104,696 A | * 8/2000 | Kadambi et al. | 370/218 |
| 6,434,153 B1 | * 8/2002 | Yazaki et al. | 370/395.21 |
| 6,542,508 B1 | * 4/2003 | Lin | 370/395.43 |

* cited by examiner

Primary Examiner—Duc Ho
Assistant Examiner—Michael Molinari
(74) Attorney, Agent, or Firm—Sughrue Mion, PLLC

(57) ABSTRACT

A network interface that processes data packets transmitted on a network is provided. The network interface includes a first data path, a second data path, a header processor, a classifier unit, and a plurality of packet processors. The first data path unit inputs downstream data packets transmitted downstream on the network, and the second data path unit inputs upstream data packets transmitted upstream on the network. The header processor inputs data packet headers of the downstream and upstream data packets from the first and second data path units and classifies the downstream and upstream data packets by comparing the headers with pre-determined rules. The classifier unit also inputs the data packet headers from the first and second data path units and evaluates the headers determine flows corresponding to the downstream and upstream data packets. The classifier unit selects a first packet processor to process both the downstream and upstream data packets corresponding to a first flow and instructs the first and second data path units to output the data packets, which correspond to the first flow, to the first packet processor. Similarly, the classifier unit selects a second packet processor to process both the downstream and upstream data packets corresponding to a second flow and instructs the first and second data path units to output the data packets, which correspond to the second flow, to the second packet processor. The classifier is further capable of balancing loads between the packet processors based on the effective load on each such packet processor.

37 Claims, 3 Drawing Sheets

A Network Monitoring and Classifying System

A Network Monitoring and Classifying System

Header Added to Packet by Data Path

Header Status Format

APPARATUS AND METHOD FOR WIRE-SPEED CLASSIFICATION AND PRE-PROCESSING OF DATA PACKETS IN A FULL DUPLEX NETWORK

FIELD OF THE INVENTION

The present invention relates to an apparatus that monitors data packets transmitted on a data network and processes the data packets. More particularly, the present invention relates to an apparatus that classifies the data packets, associates the classified data packets with a particular data flow, and processes the classified data packets via a particular packet processor that corresponds to the particular data flow. The apparatus is further optimized to operate at wire speeds. Furthermore, the present invention relates to a method employed by the apparatus.

BACKGROUND OF THE INVENTION

In a digital communication network (e.g. the internet, wide area network ("WAN"), local area network ("LAN"), etc.), data packets are transmitted over the network between a source computer (e.g. a personal computer, router, server, etc.) and a destination computer (e.g. a personal computer, router, server, etc.). Furthermore, in a network that is capable of full duplex communications, data packets can be simultaneously transmitted from the source computer to the destination computer and from the destination computer to the source computer over the same data path or channel. The transmission of data from the source computer to the destination computer is typically referred to as a "downstream" transmission of the data packets. Conversely, the transmission of data from the destination computer to the source computer is generally referred to as an "upstream" transmission.

Typically, data networks contain a relatively large number of computers, and each of the computers can operate as both a source computer and a destination computer. For example, in one instance, a particular computer in the network may perform an operation and output data to another computer in the network. In such a situation, the particular computer acts as a source computer. However, in another instance, the particular computer may receive data from another computer in the system, and in such a situation, the particular computer acts as a destination computer.

Often, each of the computers in the network forms at least part of a "node" of the network, and data is transferred among the various nodes by transmitting data packets among the computers. For example, a first computer located at a first node may run a first application program that generates first data to be subsequently processed by a second computer at a second node. In order to transfer the first data to the second computer so that it can be processed, the first computer divides the first data into a plurality of data segments and forms one or more data packets corresponding to each of the data segments. Then, the data packets are transmitted downstream from the first computer to the second computer. After the second computer receives the data packets, it may respond by sending a corresponding confirmation packet upstream to the first computer. Also, if the network is capable of full duplex communications, the second computer may simultaneously transmit data packets upstream to the first computer when the first computer is transmitting data packets downstream to the second computer.

Each of the data packets transmitted from the first computer to the second computer (and transmitted from the second computer to the first computer) typically contains a data packet header. The header often includes data that identifies the type of data contained in the data packet, the source computer from which the data packet was transmitted, the intended destination computer of the data packet, etc. An example of a data packet header is illustrated in FIG. 1.

As shown in the figure, the header HDR comprises a source internet protocol ("IP") address field 100, a destination IP address field 110, a protocol field 120, a source port field 130, and a destination port field 140. The source IP address field 100 contains a 32-bit source IP address that identifies the source computer transmitting the data packet. The destination IP address field 110 contains a 32-bit destination address that identifies the intended destination computer of the data packet. The protocol field 120 contains eight bits of protocol data that identify the data format and/or the transmission format of the data contained in the data packet. The source port field 130 includes sixteen bits of data that identify the computer port that physically outputs the data packet, and the destination port field 140 contains sixteen bits of data that represent the computer port that is supposed to input the data packet.

When data packets are transmitted over the network from the source computer to the destination computer, they are input by various network components that process the data packets and direct them to the appropriate destination computer. Such network components may be included in the destination computer and/or may be contained in an intermediate computer that processes the data as it is being transmitted from the source computer to the destination computer. If the data packets can be quickly and efficiently processed and routed between the various nodes of the network, the operation of the entire network is enhanced. For example, by quickly and efficiently transmitting data packets to the destination computer, the quality of real-time applications such as internet video conferencing and internet voice conferencing is improved. Also, the network components can quickly process the data packets to determine if they are authorized to be transmitted to the destination computer, and if they are not, the network components discard the data packets. As a result, the security of the network is greatly enhanced.

Before processing a data packet, a network component must "classify" the data packet according to various characteristics of the data packet and/or the data contained in the packet. Then, the network component processes the data packet based on its classification. Furthermore, the classification of the data packet enables the data packet to be associated with the other data packets belonging to a particular stream of packets. As a result, data packets belonging to a certain stream or flow can all be processed by the same packet processing unit.

A data packet is usually classified by evaluating the information contained in the data packet header. For example, if the data packet contains the header HDR shown in FIG. 1, a network component may classify the data packet as a first type of data packet if the source IP address falls within a first range of source IP addresses, the destination IP address falls within a first range of destination IP addresses, the protocol data falls within a first range of protocol data values, the source port data falls within a first range of source port data values, and the destination port data falls within a first range of destination port data values. On the other hand, the internet component may classify the data packet as a second type of data packet if the source IP address, destination IP address, protocol data, source port data, and destination port data respectively fall within a second range of source IP addresses, a second range of destination IP addresses, a second range of protocol data values, a second range of source port data values, and a second range of destination port data values.

Each group of data value ranges by which a data packet is classified may be considered to be a "rule". Thus, in the examples above, the data packet is classified as the first type of data packet if its header HDR satisfies a first rule defined by the first range of source IP addresses, destination IP addresses, protocol data values, source port data values, and destination port data values. On the other hand, the data packet is classified as the second type of data packet if its header HDR satisfies a second rule defined by the second range of source IP addresses, destination IP addresses, protocol data values, source port data values, and destination port data values.

After the data packet is classified, the network component is able to determine how to handle or process the data. For instance, based on the classification of the data packet, the network component may associate the data packet with a certain queue of data packets and store the data packet at the end of the queue. Then, the data packets in the queue are processed in the order in which they were stored in the queue. For example, data packets that are stored in a particular queue may be output via a particular transmission path so that they quickly reach their intended destination computer, may be evaluated to determine if the data packets are authorized to be received and further processed by the network component, may be prevented from being forwarded on the network, may be processed in a particular manner, etc. Accordingly, the network component classifies incoming data packets according to various rules based on the specific data values contained in the data packet headers HDR and processes the data packets based on their classification.

Since the network component must classify each and every data packet that it receives, it should ideally classify the data packets at a speed that equals at least the speed at which the data packets are received. By classifying the data packets as quickly as they are received, data packets do not become "bottlenecked" at the input of the network component, and the overall operational speed of the network is not degraded.

However, as the speeds at which networks are capable of transmitting data packets increase, the speeds at which network components must be able to classify and process data packets must likewise increase. For example, on a high speed Sonet network that is capable of transmitting ten gigabits per second, data packets can be transmitted at a rate of 30 million packets per second, and on a full duplex line, data packets can be transmitted at about 60 million packets per second. Thus, network components must be able to classify data packets at extraordinary speeds.

In addition to classifying data packets at high speeds, network components must be able to classify the data packets based on several parameter fields within the packet. Currently, classifying the data packets based on the several parameter fields results in classifying the packets based on hundreds of rules. Thus, to properly classify the incoming data packets without creating a bottleneck at the input of the network component, the component must determine which rule of the hundreds of rules corresponds to each of the incoming data packets and must make such determination at a very high speed. Furthermore, as the number of network users and the number of different services available on the network increase, the number of rules that will need to be evaluated by standard network components is expected to grow to ten thousand or more in the near future. As a result, the network components will need to classify data packets according to an extremely large number of rules at incredible speeds.

In light of the above demands, network components must be designed that can efficiently classify and process the data packets that are transmitted at very high speeds. In the example described above in which classified data packets are classified and stored in particular queues based on their classification, the processing speed of the network component is somewhat enhanced. However, the network component is only able to perform basic operations on the data packets travelling in one direction on the network and cannot associate groups of data packets together so that they can be processed more efficiently. Furthermore, the network component is unable to associate data packets travelling downstream in the network with corresponding data packets travelling upstream in the network. As a result, the downstream data packets and upstream data packets are processed separately in accordance with separate processes, and the overall efficiency of the network components in the network is decreased.

SUMMARY OF THE INVENTION

One object of the present invention is to provide an apparatus that can quickly and efficiently process data packets transmitted on a data network.

Another object of the present invention is to provide an apparatus that can quickly and efficiently classify data packets transmitted upstream and downstream on a data network.

Yet another object of the present invention is to provide an apparatus that overcomes problems associated with existing network monitoring devices.

In order to achieve the above and other objects, a network interface that processes data packets transmitted on a network is provided. The network interface comprises: a first data path unit that inputs a first data packet transmitted on the network, wherein the first data packet comprises a first header; a second data path unit that receives a second data packet transmitted on the network, wherein the second data packet comprises a second header; a header processor unit that inputs the first header from the first data path unit and the second header from the second data path unit, evaluates the first header to determine which rules apply to such header, and evaluates the second header to determine which rules apply to such header; and a classifier unit that inputs the first header from the first data path unit and the second header from the second data path unit, evaluates the first header to determine a flow corresponding to the first data packet, and evaluates the second header to determine a flow corresponding to the second data packet.

In order to further achieve the above and other objects, a network interface that processes data packets transmitted on a network is provided. The network interface comprises: a first data path unit that inputs downstream data packets transmitted downstream on the network, wherein the downstream data packets comprise downstream headers, respectively; a second data path unit that inputs upstream data packets transmitted upstream on the network, wherein the upstream data packets comprise upstream headers, respectively; a header processor unit that inputs the first header from the first data path unit and the second header from the second data path unit, evaluates the first header to determine which rules apply to such header, and evaluates the second header to determine which rules apply to such header; a classifier unit that inputs the downstream headers from the first data path unit and the upstream headers from the second data path unit, evaluates the downstream headers to respectively determine flows corresponding to the downstream data packets, and evaluates the upstream headers to respectively determine flows corresponding to the upstream data packets; packet processors at least indirectly coupled to the classifier unit, wherein the classifier unit selects a first packet processor of said packet processors to process both upstream data packets and downstream data packets corresponding to a first flow, and is further capable of balancing the load between such packet processors.

BRIEF DESCRIPTION OF THE DRAWINGS

The above and other objects and advantages of the present invention will become more apparent by describing in detail preferred embodiments thereof with reference to the attached drawings in which.

DETAILED DESCRIPTION OF THE PREFERRED EMBODIMENTS

The following description of the preferred embodiments discloses specific configurations, components, and process steps. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and steps of the present invention that would have been known to one skilled in the art are omitted for the sake of clarity and brevity.

Figure 2:
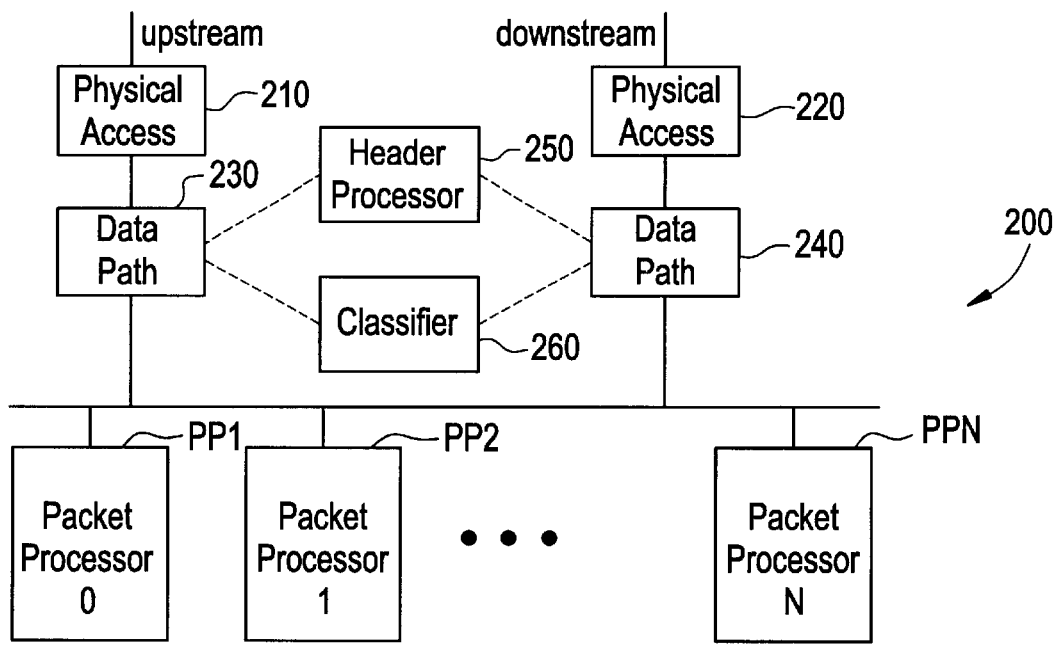
FIG. 2 illustrates an example of the structure of a network monitoring and classifying ("NMC") system according to an embodiment of the present invention.

The present invention relates to a monitoring and classifying ("NMC") system that can simultaneously monitor the upstream and downstream flow of data packets. An illustrative, non-limiting embodiment of the system 200 is shown in FIG. 2 and comprises physical access units 210 and 220, data path units 230 and 240, a header processor 250, and a classifying unit 260. Also, the system 200 comprises a plurality of packet processors PP1 to PPN. In a preferred embodiment, the NMC system 200 at least partially constitutes a network component, and the network component can be located at a node of a network or between nodes of the network. In an alternative embodiment, the network component can be directly coupled to more than two nodes of the network.

The physical access unit 210 comprises standard layer one and layer two components that input and capture data packets travelling upstream from one node to another node of the network. The physical access unit 210 can be created from one or more commercially available hardware units known as physical access ("PHY") devices, and media access control ("MAC") devices. Also, the physical access unit 220 is similar to the unit 210, except that it inputs and captures data travelling downstream from one node to another node. For example, the physical access unit 210 may input and capture data packets travelling from a first node to a second node of the network, and the physical access unit 220 may input and capture data packets travelling from the second node to the first node. Furthermore, the units 210 and 220 are not limited to inputting and capturing data packets that are transmitted between the same nodes of the network. For instance, the physical access unit 210 may input data packets that are transmitted from the first node to the second node, and the physical access unit 220 may input data packets that are transmitted from the second node to a third node. Alternatively, the physical access unit 210 may input data packets that are transmitted from the first node to the second node, and the physical access unit 220 may input data packets that are transmitted from the third node to the first node. In another embodiment, the unit 210 may input data packets that are transmitted from the first node to the second node, and the unit 220 may input data packets that are transmitted from the third node to a fourth node.

The data path unit 230 inputs and stores the data packets captured by the physical access unit 210 and performs preliminary validity and error checking operations on the data packets to ensure that they are valid and error-free. For example, the data path unit 230 may perform IP and transport control protocol ("TCP") standard checksum operations and internet protocol version 4 ("IPV4") operations to verify the validity of an incoming packet. The data path may further determine if the lengths of the data packets fall within an acceptable range of lengths. If the data packets are valid and error-free, the data path unit 230 extracts the data packet headers HDR from the data packets and forwards them to the header processor 250 and the classifier 260. In addition, in a preferred embodiment, the data path unit 230 evaluates the source IP addresses and destination IP addresses in the headers HDR and sorts the data packets based on the value of the IP addresses. For example, the data path unit 230 may sort the data packets from the smallest source IP address to the largest source IP address. Also, if two or more data packets have the same source IP address, the unit 230 may sort such data packets from the smallest destination IP address to the largest destination IP address.

Once such sorting has been performed, the data path unit 230 can easily identify packets, such as a confirmation packet that acknowledges the receipt of a data packet sent by a first node to a second node and that is transmitted from the second node to the first node. When such acknowledgment takes place, the order of the destination and source IP addresses in the confirmation packet is reversed with respect to the originally sent data packet (or packets) because the confirmation packet travels from the second node to the first node, whereas the originally sent data packet or packets travel from the first node to the second node. In other words, the sending/receiving function of the first and second nodes change depending on whether the originally sent data packet or packets are transmitted or the confirmation packet is transmitted. By sorting confirmation packets along with the corresponding original data packet or packets, the NMC system 200 can easily identify the confirmation packets corresponding to a particular data packet or packets and can confirm that the particular data packet or packets were in fact received by the target destination. Although the above sorting technique is explained in the context of confirmation packets, it is not limited to the sorting of confirmation packets, and virtually any type of data packets can be sorted, regardless of their content.

The data path unit 230 can be created from hardware, software, or a combination of hardware and software. Also, since the structure and operation of the data path unit 240 is similar to the structure and operation of the data path unit 230, a detailed description of the unit 240 is omitted for the sake of brevity.

The header processor 250 inputs the data packet headers HDR from the data path units 230 and 240 and classifies the data packets by determining which rule or rules of a predetermined set of rules correspond to each of the headers HDR. An illustrative example of a device that classifies data packets according to a predetermined set of rules is described in a U.S. Patent Application entitled "High Speed Apparatus and Method for Classifying a Data Packet Based on Data Values Contained In The Data Packet". The application was filed on Feb. 29, 2000, invented by Michael Ben-Nun, and assigned to the assignee of the present application. Such application is incorporated herein by reference for all purposes. After the header processor 250 classifies a data packet, it may output rule information to the data path unit 230 or 240. In one embodiment, the rule information contains data and/or a command that corresponds to the rule by which the data packet is classified, and the data path unit 230 or 240 stores the rule information with the corresponding data packet so that the information can be used when the data packet is subsequently processed. Also, in a preferred embodiment, if the header HDR of a data packet does not correspond to any of the predetermined rules, the header processor 250 generates a "flow-kill" command. Such command is output to the classifier 260 via the data path unit 230 or 240 to inform the classifier 260 that the corresponding data packet does not correspond to any of the predetermined rules and that there is no need to maintain a process flow for such packets.

The classifier 260 inputs the headers HDR of the data packets and evaluates the headers HDR to determine a specific "flow" corresponding to each of the data packets. A specific flow relates to the communications or the transfer of data packets between two computers (or nodes) of the network. For instance, data packets transmitted from a first source computer (or node) to a first destination computer (or node) of the network belong to a first flow, and data packets transmitted from the first source computer (or node) to a second destination computer (or node) belong to a second flow. By evaluating the contents of the HDR of a data packet, the classifier 260 can determine the specific flow corresponding to the data packet.

In addition, in a full duplex communications system, downstream data packets may be transferred from a first computer (or node) to a second computer (or node), and upstream data packets may be transferred from the second computer (or node) to the first computer (or node). In such a scenario, the classifier 260 may consider both the downstream and upstream data packets to correspond to the same flow. For example, assume that the first computer has an IP address "A" and the second computer has an IP address "B". If a first data packet is transmitted downstream from the first computer to the second computer, the first header HDR of the first data packet has a source IP address that equals "A" and has a destination IP address that equals "B". As described above, the first header HDR is extracted from the data packet via the data path unit 240 and supplied to the classifier 260, and upon evaluating the first header HDR, the classifier 260 classifies the packet as belonging to the first flow. On the other hand, if a second data packet is transmitted upstream from the second computer to the first computer, for example for the purpose of acknowledging receipt of such first packet by the second computer, the second header HDR of the second data packet would have a source IP address that equals "B" and would have a destination IP address that equals "A". In such case, the data path unit 230 extracts the second header HDR from the data packet and outputs it to the classifier 260 as described above. Then, the classifier 260 evaluates the second header HDR and also classifies the second packet as belonging to the first flow. In other words, the classifier 260 classifies both the first and second data packets as belonging to the first flow because they are part of the same full duplex communication between the first and second computers.

In the above example, the classifier 260 determines the flow to which a data packet belongs based on the source and destination IP addresses contained in the header HDR of the data packet. In addition to determining the flow of a data packet based on the IP addresses, the classifier 260 may also determine the flow based on the source and destination port values contained in the header HDR of the data packet. For example, in a full duplex communication system, if a first downstream data packet has a source IP address "A", a source port value "A1", a destination IP address "B", and a destination port value "B1", the classifier 260 may classify the first downstream data packet as belonging to a first flow. Similarly, a first upstream data packet having a source IP address "B", a source port value "B1", a destination IP address "A", and a destination port value "A1" may still be classified as belonging to the first flow. However, a second downstream data packet having a source IP address "A", a source port value "A2", a destination IP address "B", and a destination port value "B2" may be classified as belonging to a second flow. Furthermore, the classifier 260 can additionally or alternatively identify a specific flow of the data packet based on the protocol value contained in the header HDR of the data packet.

Each of the packet processors PP1 to PPN is designated to process data packets belonging to a particular flow. For example, a first packet processor (e.g. the processor PP1) may be designated to process data packets belonging to a first flow, and a second packet processor (e.g. the processor PP2) may be designed to process data packets belonging to a second flow. Since the packet processor PP1 only processes data packets belonging to the first flow, it performs the same or similar types of processing functions for all of the data packets that it receives. As a result, the processor PP1 is able to predict the types of data packets that it will receive and predict the types of processing operations it will have to perform. Thus, the processor PP1 is capable of utilizing parallel processing, data cache hits, and other types of processing techniques to increase its processing speed and efficiently and quickly process the data packets corresponding to the first flow. Similarly, since the packet processor PP2 only processes data packets belonging to the second flow, it is able to process all of the data packets belong to the second flow in an extremely quick and efficient manner.

Also, as described above, upstream and downstream data packets that belong to the same flow are processed by a single packet processor PP1, PP2, . . . , or PPN. As a result, two different packet processors are not required to separately process the upstream data packets and the downstream data packets. Thus, fewer processors PP1 to PPN are required to process the data packets transmitted on the network, and the overall processing operation of the network is enhanced. In addition, as shown in FIG. 2, the packet processors PP1 to PPN are connected to the data path units 230 and 240 via a data bus. As a result of such architecture, packet processors can easily be added to or removed from the system. Thus, as the number of process flows handled by the system 200 increases (or decreases), processors can be simply added to (or removed from) the system 200 to accommodate the change in the number of process flows.

The classifier 260 designates which packet processors PP1 to PPN process data packets corresponding to the various flows and instructs the data path units 230 and 240 to output the data packets to the appropriate processor PP1, PP2, . . . , or PPN. In one embodiment, the classifier 260 designates which processors PP1 to PPN process which data packets in the following manner. First, as described above, the classifier 260 receives a particular header HDR of a particular data packet and determines that the particular data packet corresponds to a particular flow. Then, the classifier 260 determines if any of the packet processors PP1 to PPN have previously been designated as a particular flow processor to process data packets belonging to the particular flow. If none of the processors PP1 to PPN have been previously designated as the particular flow processor, the classifier 260 selects one of the processors PP1 to PPN that has not been previously designated to process data packets belonging to any flow. Then, the classifier 260 designates the selected processor as the particular flow processor to process data packets corresponding to the particular flow and determines that the particular data packet should be output to the particular data processor. In another embodiment, the classifier 260 receives information from each of the packet processors PP1 to PPN indicating the relative load on each of the packet processors PP1 to PPN. Then, the classifier 260 assigns a new flow to the packet processor PP1, PP2, . . . , or PPN that has the smallest load. As a result, the efficiency of the system 200 is enhanced because the loads of the packet processors PP1 to PPN are dynamically balanced. On the other hand, if the classifier 260 determines that the particular data packet belongs to the particular flow and determines that one of the packet processors PP1 to PPN has previously been designated as the particular flow processor, the classifier 260 determines that the particular data packet should be output to the particular data processor.

However, as mentioned above, if the header processor 250 evaluates a header HDR and determines that the corresponding data packet cannot be classified according to one of the predetermined rules, the header processor 250 outputs the "flow-kill" command to the classifier 260 via the data path unit 230 or 240. When the classifier 260 receives the flow-kill command, the classifier 260 is instructed not to determine the flow to which the data packet belongs. In other words, if a data packet does not satisfy any of the predetermined rules, the header processor 250 determines that NMC system 200 has no significant use for the data packet or that the data packet has been unlikely received in error. Thus, the processor 250 outputs the "flow-kill" command to instruct the classifier 260 not to waste time determining the flow corresponding to the data packet. As a result, the overall processing speed of the system 200 is increased. Also, if one of the processors PP1 to PPN had not previously been designated by the classifier 260 to process data packets belonging to the "flow" of the data packet, the "kill-flow" command prevents the classifier 260 from unnecessarily determining that the data packet belongs to a new flow and from unnecessarily designating an additional processor PP1, PP2, . . . , or PPN to process the data packet belonging to the new flow. Consequently, by generating the "flow-kill" command, the header processor 250 prevents valuable system resources (i.e. one of the processors PP1 to PPN) from being wasted by being dedicated to processing the data packet that is not useful or that has been erroneously received.

In one embodiment, the "flow-kill" command is additionally or alternatively output to the data path 230 or 240. When the data path 230 or 240 receives such command, it deletes or otherwise discards the erroneous or useless data packet stored in the data path 230 or 240.

In any event, after the classifier 260 determines that a particular data packet should be output to the particular flow processor, it outputs flow information to the data path unit 230 or 240. The flow information comprises flow identification data, packet processor data, and other control and/or status information. The flow identification data indicates the flow (i.e. the particular flow) to which the particular data packet belongs, and the packet processor data identifies the packet processor PP1, PP2, . . . , or PPN (i.e. the particular packet processor) to which the particular data packet should be supplied. In response to the flow information, the data unit 230 or 240 outputs the particular data packet to the particular packet processor.

A more detailed example of how the classifier 260 designates the packet processors PP1 to PPN to process data packets belonging to various flows will be described below. When the NMC system 200 is first activated, no processors PP1 to PPN have been assigned to process any flows. Afterwards, when a first downstream data packet is transmitted on the network, the data packet is input to and captured by the physical access unit 220. Then, the data path unit 240 inputs and stores the data packet and determines whether or not it is valid and error-free. If the first downstream data packet is valid and error-free, the data path unit 240 extracts the header HDR from the data packet and outputs it to the header processor 250 and the classifier 260. Of course, the data path unit 240 could alternatively output the header HDR to the processor 250 and classifier 260 before it determines if the packet is valid and error-free. As a result, the unit 240 does not have to wait to determine that the data packet is valid and error-free before forwarding the header HDR to the header processor 250 and classifier 260, and thus, the throughput of the system 200 is enhanced.

The header processor 250 evaluates the header HDR, classifies the data packet according to a first rule based on the contents of the header HDR, and outputs rule information to the data path unit 240 based on the classification of the data packet. The rule information may include various data and/or commands that correspond to the first rule.

The classifier 260 also evaluates the header HDR and determines a flow (e.g. a first flow) to which the data packet belongs. Then, the classifier 260 determines if any of the packet processors PP1 to PPN have previously been designated to process data packets that belong to the first flow. Since the first downstream data packet is the first data packet received by the system 200, no processors have previously been designated. As a result, the classifier 260 designates one of the processors PP1 to PPN (e.g. the processor PP1) as the first flow packet processor PP1. Then, the classifier 260 outputs corresponding flow information to the data path unit 240.

In response to the flow information, the data path unit 240 outputs the first downstream data packet to the first flow packet processor PP1. In addition, the data path unit 240 may also supply the flow information from the classifier 260 and the rule information from the header processor 250 to the processor PP1 along with the data packet. When the processor PP1 receives the data packet, the processor PP1 appropriately processes the data packet. Furthermore, the first flow packet processor PP1 may process the data packet in accordance with the received flow information and/or rule information.

Subsequently, when a first upstream data packet is transmitted on the network, the data packet is input to and captured by the physical access unit 210. Then, the data path unit 230 inputs and stores the data packet and determines whether or not it is valid and error-free. If the first upstream data packet is valid and error-free, the data path unit 230 extracts the header HDR from the data packet and outputs it to the header processor 250 and the classifier 260. In an alternative embodiment, the data path unit 230 outputs the header HDR to the processor 250 and classifier 260 before it determines that the data packet is valid and error-free. The header processor 250 evaluates the header HDR, classifies the data packet according to a second rule based on the contents of the header HDR, and outputs rule information to the data path unit 230 based on the classification of the data packet.

The classifier 260 also evaluates the header HDR and determines a flow (e.g. the first flow) to which the first upstream data packet belongs. Then, the classifier 260 determines if any of the packet processors PP1 to PPN have previously been designated to process data packets that belong to the first flow. Since the first flow packet processor PP1 has been previously designated to process packets corresponding to the first flow, the classifier 260 outputs corresponding flow information to the data path unit 230 indicating that the first upstream data packet should be processed by the processor PP1.

In response to the flow information, the data path unit 230 outputs the first upstream data packet to the first flow packet processor PP1. Also, as in the previous case, the flow information and the rule information may additionally be supplied to the processor PP1 along with the data packet. When the processor PP1 receives the first upstream data packet, flow information, and/or rule information, the processor PP1 appropriately processes the data packet.

Subsequently, when a second downstream data packet is transmitted on the network, the data packet is input to and captured by the physical access unit 220. Then, the data path unit 240 inputs and stores the data packet and determines whether or not it is valid and error-free. If the second downstream data packet is valid and error-free, the data path unit 240 extracts the header HDR from the data packet and outputs it to the header processor 250 and the classifier 260. Again, the data path unit 240 may alternatively output the header HDR to the processor 250 and classifier 260 before it determines that the data packet is valid and error-free. The header processor 250 evaluates the header HDR, classifies the data packet according to a third rule based on the contents of the header HDR, and outputs rule information to the data path unit 240 based on the classification.

The classifier 260 also evaluates the header HDR and determines a flow (e.g. a second flow) to which the data packet belongs. Then, the classifier 260 determines if any of the packet processors PP1 to PPN have previously been designated to process data packets that belong to the second flow. Since no processors have previously been designated, the classifier 260 designates one of the processors PP2 to PPN (e.g. the processor PP2) as the second flow packet processor PP2. Then, the classifier 260 outputs corresponding flow information to the data path unit 240.

In response to the flow information, the data path unit 240 outputs the second downstream data packet to the second flow packet processor PP1. In addition, the data path unit 240 may also supply the flow information and the rule information to the processor PP2 along with the data packet. When the processor PP2 receives the data packet, the processor PP2 appropriately processes the data packet.

In a preferred embodiment, each of the packet processors PP1 to PPN comprises first-in-first-out ("FIFO") buffers to receive the data packets, flow information, and/or rule information from the data path units 230 and 240. As a result, the processors PP1 to PPN can adequately process the data packets in the event that data packets are sometimes output from the data path units 230 and 240 at a rate that is faster than the rate at which the processors PP1 to PPN can process the data packets.

Figure 1:
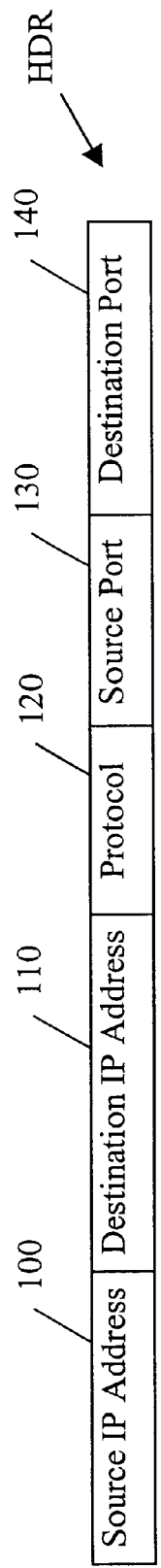
FIG. 1 illustrates an example of the format of a header of a data packet.
Figure 3:
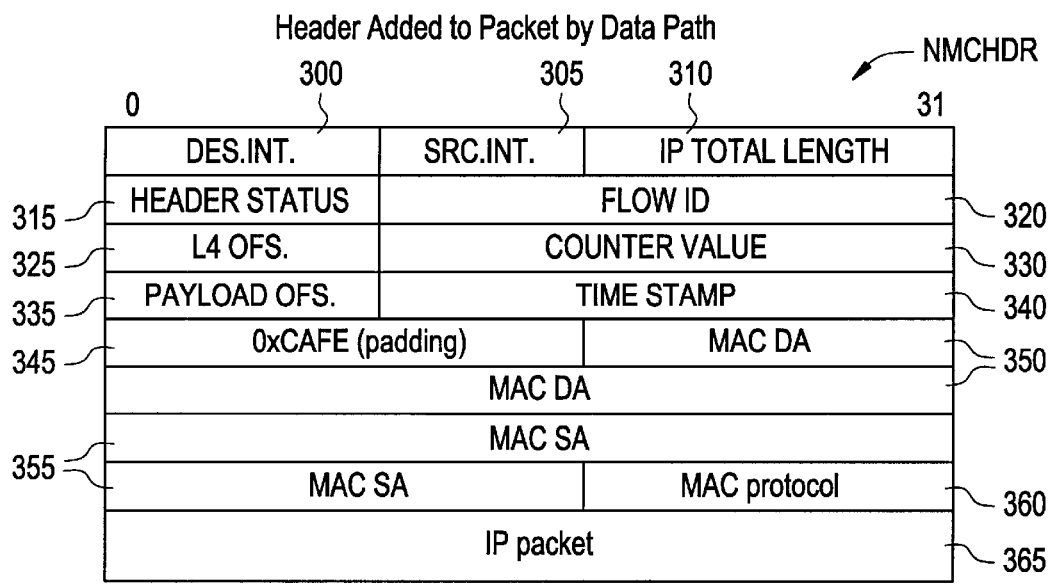
FIG. 3 illustrates an example of an NMC header generated by the NMC system shown in FIG. 2.

In one embodiment, after the header processor 250 and classifier 260 respectively output the rule information and flow information to the data path unit 230 or 240 and before the unit 230 or 240 outputs the data packet to one of the packet processors PP1 to PPN, the unit 230 or 240 adds an NMC header NMCHDR to the data packet. The header NMCHDR may replace the header HDR of the data packet shown in FIG. 1 or may be appended to the data packet in addition to the header HDR. The header NMCHDR of a data packet contains information and data that is utilized by the processor PP1, PP2, . . . , or PPN to process the data packet, and an illustrative example of the header NMCHDR is shown in FIG. 3.

As shown in the figure, the MAC header NMCHDR comprises a destination interface field 300, a source interface field 305, an IP total length field 310, a header status field 315, a flow ID field 320, a layer four offset field 325, a counter value field 330, a payload offset field 335, and a time stamp field 340. The header NMCHDR also includes a padding field 345, a MAC destination address field 350, a MAC source address field 355, and a MAC protocol field 360. In addition, as mentioned above, the header NMCHDR is appended to the data packet 365 and may replace the header HDR shown in FIG. 1 or may be appended in addition to the header HDR.

The destination interface field 300 contains one byte of information that was directly or indirectly generated by the classifier 260 and that indicates which one of the packet processors PP1 to PPN should receive the data packet 365. The source interface field 305 contains one byte of data that identifies the port from which the packet was originally received. The IP total length field 310 is two bytes long and includes information that indicates the total length of the data packet 365 that is attached to the header NMCHDR.

The header status field 315 is one byte long and is divided into the five sub-fields that contain information relating to the status of the header NMCHDR. The five sub-fields will be described in more detail below in conjunction with FIG. 4. The flow ID field 320 is three bytes long and contains information that identifies the flow to which the data packet 365 belongs. Specifically, as described above, the classifier 260 determines the particular flow that corresponds to a particular data packet and outputs flow information to the data path unit 230 or 240 that identifies the particular flow. Then, the data path unit 230 or 240 uses such information to directly or indirectly create the data that is contained in the flow ID field 320 and that identifies the flow of the data packet 365. The layer four offset field 325 contains data that indicates the number of bytes by which the transport control protocol ("TCP") or the user datagram protocol ("UDP") header in the fourth level of the communication model is offset. The information in the TCP or UDP header describes the type of protocol used to transfer packets over the network and allows the data processors to manipulate the content of the data of a packet in accordance with the transport protocol used. For example, the TCP layer encapsulates the data in a stream of TCP packets, and each TCP packet may be further fragmented into multiple IP packets by the IP layer. By providing this information, the packet processor is capable of appropriately addressing the data received.

The counter value field 330 contains any type of counter value that is used by the packet processor PP1, PP2, . . . , or PPN to process the data packet 365. For example, the counter value field 330 may contain data that indicates the number of bytes in the data packet 365, the number of data packets contained in a given transmission, or the number of erroneous data packets contained in a given transmission. Clearly, the counter value field 330 can contain any type of counter value depending on the specific processing operation of the packet processor PP1, PP2, . . . , or PPN that receives the data packet 365.

The payload offset field 335 is one byte long and contains information relating to the number of bytes that exist between the data packet (i.e. the payload) 365 and the TCP or UDP header. The time stamp field 340 is three bytes long and contains data (i.e. a time stamp) that corresponds to the time that the data packet was received by the data path unit 230 or 240. In one embodiment, the time stamp is set equal to the general time stamp of the network so that the time stamp in the field 340 is synchronized with the time stamp of the network.

The padding field 345 is currently not in use and may contain arbitrary data. This field can be used for future upgrades of the interface between the data paths and the packet processors. The MAC destination address, MAC source address, and MAC protocol fields 350, 355, and 360 contain data that was provided with the original packet when it was received after the second layer processing by the physical access unit 210. More specifically, the fields 350, 355, and 360 contain data that was provided with the original packet when it was received after the second layer processing by the MAC device within the physical access unit 210. This information is passed on to the respective packet processor for further handling.

Figure 4:
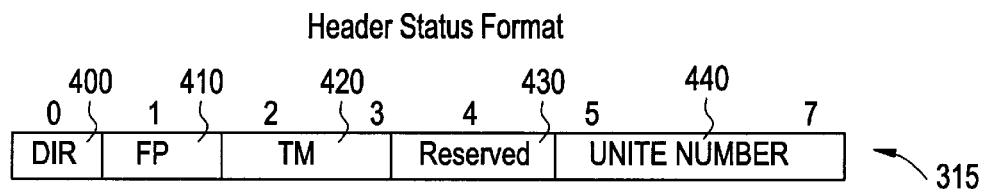
FIG. 4 illustrates an example of the sub-fields of the header status field contained in the NMC header shown in FIG. 3.

FIG. 4 is an illustrative example of the five sub-fields of the header status field 315. As shown in the figure, the header status field comprises a one bit packet direction field 400, a one bit first packet field 410, a two bit transfer mode field 420, a one bit reserved field 430, and a three bit unite number field 440. The direction field 400 contains data that indicates whether the data packet 365 has been transmitted upstream or downstream on the network. For example, the field 400 may contain a "0" if the data packet 365 has been transmitted upstream and may contain a "1" if the data packet 365 has been transmitted downstream. The first packet field 410 contains information that indicates if the data packet 365 is the first packet of a particular flow. Specifically, as described above, when the classifier 260 evaluates the header HDR of a data packet, it determines the particular flow corresponding to the data packet and determines if one of the processors PP1 to PPN has been previously designated to process data packets having the particular flow. If one of the processors PP1 to PPN has previously been designated, the data packet is not the first data packet of the particular flow. In such case, the classifier 260 outputs corresponding information to the data path unit 230 or 240, and the unit 230 or 240 includes data in the first packet field 410 indicating that the data packet 365 is not the first data packet of the particular flow. For example, the field 410 may contain a "0" if the data packet 365 is not the first data packet of the flow. On the other hand, if one of the processors PP1 to PPN has not been previously designated by the classifier 260 to handle the particular flow, the classifier 260 designates one of the processors PP1 to PPN to process data packets belonging to the particular flow. Also, the classifier 260 determines that the data packet 365 is the first data packet that has been received that belongs to the particular flow and outputs corresponding information to the data path unit 230 or 240. Then, the unit 230 or 240 includes information in the first packet field 410 indicating that the data packet 365 is the first data packet corresponding to the particular flow. For example, the field 410 may contain a "1" if the data packet 365 is the first data packet of the flow.

The transfer mode field 420 contains two bits of information that indicate one of four modes in which data is being transferred to one of the processors PP1 to PPN from the data path unit 230 or 240. In all four modes, the first sixteen bytes of the header NMCHDR (i.e. the fields 300, 305, 310, 315, 320, 325, 330, 335, and 340) are transferred to one of the packet processors PP1 to PPN. Specifically, if the field 420 contains the data "00", the system 200 operates in an "entire packet transfer mode". This mode is the default transfer mode of the system in which the header NMCHDR and the entire packet 365 are transferred to one of the processors PP1 to PPN. If the field 420 contains the data "01", the system 200 operates in a "packet only transfer mode". In this mode, the header NMCHDR is transferred without the MAC information (i.e. without the fields 350, 355, and 360) to one of the processors PP1 to PPN. Also, in this mode, the data packet 365 is transferred to one of the processors PP1 to PPN. If the field 420 contains the data "10", the system 200 operates in an "IP and TCP/IP header transfer mode". In this mode, the header NMCHDR (without the MAC information) and the IP and TCP/IP headers of the data packet 365 are transmitted to one of the processors PP1 to PPN. Finally, if the field 420 contains the data "11", the system 200 operates in the "NMC header transfer mode". In this mode, only the first sixteen bytes of the header NMCHDR (i.e. the fields 300, 305, 310, 315, 320, 325, 330, 335, and 340) are transferred to one of the processors PP1 to PPN. Clearly, the types of transfer modes described above are just examples of the types of transfer modes that can be implemented, and virtually any type of transfer mode may be employed.

The reserved field 430 is not used in the present embodiment and is reserved for future use. Also, the unite number field 440 is a three bit field that is used to associate data packets belonging to different flows with each other. Associating data packets belonging to different flows is important in many operations and applications of network communications. For example, in an IP telephony operation, a first data packet belonging to a first flow (e.g. belonging to a "father" flow or process) is transmitted across the network and initiates the transmission of a second data packet belonging to a second flow (e.g. belonging to a "child" flow or process). As a result, the flow ID data contained in the flow ID field 320 relating to the first data packet is different than the flow ID data contained in the flow ID field 320 relating to the second data packet. Thus, the first and second data packets would ordinarily be processed by different packet processor PP1 to PPN because they relate to different flows. However, in order to efficiently process the first and second data packets in the telephony operation, the data packets should be processed by the same packet processor PP1, PP2, . . . , or PPN. In such case, the data path unit 230 or 240 stores the same data in the unite number field 440 of the header NMCHDR of the first data packet (belonging to the first flow) and in the unite number field 440 of the header NMCHDR of the second data packet (belonging to the second flow). As a result, the first and second data packets belonging to different flows can be "united" with each other and processed by the same packet processor PP1, PP2, ..., or PPN.

As noted above, the data in the flow ID fields 320 relating to the first and second data packets are different, but the data in the unite number fields relating to the first and second data packets are the same. In an alternative embodiment, the classifier 260 recognizes that the first and second data packets are related to each other and should be processed by the same processor PP1, PP2, ..., or PPN. In such case, the classifier 260 outputs data to the data path unit 230 or 240 so that the unit 230 or 240 places the same data value in the flow ID fields 320 of the headers NMCHDR relating to both of the first and second data packets. However, in order to recognize the fact that the first data packet belongs to the first flow and initiated a new second flow containing the second data packet, the data path unit 230 or 240 places different data values in the unite number fields 440 corresponding to the first and second data packets.

As described above, the NMC system 200 is designed to efficiently classify and process the data packets that are transmitted at very high speeds. Furthermore, since each of the packet processors is dedicated to process data packets belonging to the same flow, each processor is capable of processing data packets more efficiently and quickly than previous systems. Moreover this allows the implementation of service aware networks ("SAN") where such an NMC system is capable of handling the network traffic in relation to the application layer which is the seventh layer of the communication model. In addition, since each packet processor is capable of processing both the upstream and downstream data packets belonging to the same flow, two processors are not needed to process the upstream and downstream data packets.

Also, as shown in FIG. 2, the architecture of the NMC system 200 is designed so that packet processors can be easily added to the system 200. Thus, since the bandwidth (i.e. the number of flows that can be processed) and performance of the system 200 can be increased merely by adding additional packet processors, increasing the bandwidth and enhancing the performance of the system is very simple and uncomplicated.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims and equivalents thereof.

What is claimed is:

1. A network interface that processes data packets transmitted on a network, comprising:
    a first data path unit that inputs only data packets transmitted upstream on the network, wherein a first data packet input to the first data path unit comprises a first header, said first header comprising a first source address and a first destination address
    a second data path unit that receives only data packets transmitted downstream on the network, wherein a second data packet received by the second data path unit comprises a second header, said second header comprising a second source address and a second destination address and
    a classifier unit that inputs the first header from the first data path unit and the second header from the second data path unit, evaluates the first header to determine a flow corresponding to the first data packet, and evaluates the second header to determine a flow corresponding to the second data packet, wherein the first source address is different from the second source address and the first destination address is different from the second destination address, and wherein the first data packet and the second data packet belong to the same flow.

2. The network interface as claimed in claim 1, further comprising:
    a first processor that processes data packets belonging to a first flow; and
    a second processor that processes data packets belonging to a second flow,
    wherein, when the classifier unit determines that the first data packet belongs to the first flow, the classifier unit instructs the first data path unit to output the first data packet to the first processor for processing, and
    wherein, when the classifier unit determines that the second data packet belongs to the second flow, the classifier unit instructs the second data path unit to output the second data packet to the second processor for processing.

3. The network interface as claimed in claim 2, wherein, when the classifier unit determines that the first data packet belongs to the second flow, the classifier unit instructs the first data path unit to output the first data packet to the second processor for processing, and
    wherein, when the classifier unit determines that the second data packet belongs to the first flow, the classifier unit instructs the second data path unit to output the second data packet to the first processor.

4. The network interface as claimed in claim 3, wherein the first data packet belongs to the second flow and is output to the second processor, and
    wherein the first data path unit outputs first data type information to inform the second processor that the first data packet contains a first type of data.

5. The network interface as claimed in claim 2; further comprising:
    a first FIFO unit that receives the data packets belonging to the first flow and outputs the data packets belonging to the first flow to the first processor; and
    a second FIFO unit that receives the data packets belonging to the second flow and outputs the data packets belonging to the second flow to the second processor.

6. The network interface as claimed in claim 2, wherein a parent data packet having a corresponding parent header is transmitted on the network and causes a child data packet having a corresponding child header to be transmitted on the network,
    wherein the parent data packet and the child data packet correspond to different flows, and
    wherein the classifier unit determines that the parent data packet and the child data packet correspond to the different flows but are related.

7. The network interface as claimed in claim 6, wherein the classifier unit causes the parent data packet and the child data packet to be output to the same one of the packet processors after determining that the parent data packet and the child data packet are related.

8. The network interface as claimed in claim 2, wherein the first data packet belongs to the first flow and is output to the first processor, and wherein the first data path unit outputs first data type information to inform the first processor that the first data packet contains a first type of data.

9. The network interface as claimed in claim 8, wherein the second data packet belongs to the second flow and is output to the second processor, and wherein the second data path unit outputs second data type information to inform the second processor that the second data packet contains a second type of data.

10. The network interface as claimed in claim 1, further comprising:

a header processor coupled to the first data path unit, wherein the header processor receives the first header from the first data path unit and classifies the first data packet by comparing the first header with predetermined rules.

11. The network interface as claimed in claim 10, wherein the header processor is coupled to the second data path unit, wherein the header processor receives the second header from the second data path unit and classifies the second data packet by comparing the second header with the predetermined rules.

12. The network interface as claimed in claim 10, wherein, when the header processor determines that the first header corresponds to none of the predetermined rules, the header processor at least indirectly outputs a command to the classifier unit to instruct the classifier unit not to evaluate the first header and not to determine a flow corresponding to the first data packet.

13. The network interface as claimed in claim 10, wherein, when the header processor determines that the first header corresponds to none of the predetermined rules, the header processor at least indirectly outputs a command to the first data path unit to instruct the first data path unit to discard the first data packet.

14. The network interface as claimed in claim 1, wherein the first data path unit performs a packet validity operation to determine whether or not the first data packet is valid, and wherein the second data path unit performs the packet validity operation to determine whether or not the second data packet is valid.

15. The network interface as claimed in claim 14, wherein, when the first data path unit determines that the first data packet is not valid, the first data path unit deletes the first data packet, and wherein, when the second data path unit determines that the second data packet is not valid, the second data path unit deletes the second data packet.

16. The network interface as claimed in claim 1, further comprising:

a first processor and a second processor, wherein, when the classifier unit determines that the first data packet belongs to a first flow, the classifier unit determines whether or not one of the first processor and second processor has been previously designated to process data packets corresponding to the first flow, wherein, when the classifier unit determines that none of the first processor and the second processor has been previously designated to process data packets corresponding to the first flow, the classifier unit designates the first processor to process data packets corresponding to the first flow and instructs the first data path unit to output the first data packet to the first processor for processing, and wherein, when the classifier unit determines that the first processor has been previously designated to process data packets corresponding to the first flow, the classifier unit instructs the first data path unit to output the first data packet to the first processor for processing.

17. The network interface as claimed in claim 16, wherein, when the classifier unit determines that the second data packet corresponds to the first flow and determines that the first processor has been previously designated to process data packets corresponding to the first flow, the classifier unit instructs the second data path unit to output the second data packet to the first processor for processing.

18. The network interface as claimed in claim 1, further comprising a first processor and a second processor, wherein the classifier evaluates first load information to determine a first load of the first processor and evaluates second load information to determine a second load of the second processor, and wherein, when the classifier determines that one of the first data packet and the second data packet is a new data packet belonging to a new flow, the classifier unit at least indirectly causes the new data packet to be output to the first processor if the first load is less than the second load and at least indirectly causes the new data packet to be output to the second processor if the second load is less than the first load.

19. The network interface as claimed in claim 1, wherein the first data path unit receives a plurality of headers corresponding to a plurality of data packets, wherein the plurality of headers include the first header and the plurality of data packets include the first data packet, and wherein the first data path unit sorts the plurality of data packets based on information contained in the plurality of headers.

20. The network interface as claimed in claim 19, wherein said information contained in the plurality of headers includes the value of at least one IP address contained in each of the headers.

21. A network interface that processes data packets transmitted on a network, comprising:

a first data path unit that inputs only downstream data packets transmitted downstream on the network, wherein the downstream data packets comprise downstream headers, respectively;

a second data path unit that inputs only upstream data packets transmitted upstream on the network, wherein the upstream data packets comprise upstream headers, respectively;

a classifier unit that inputs the downstream headers from the first data path unit and the upstream headers from the second data path unit, evaluates the downstream headers to respectively determine flows corresponding to the downstream data packets, and evaluates the upstream headers to respectively determine flows corresponding to the upstream data packets; and packet processors at least indirectly coupled to the classifier unit, wherein a first data packet is a downstream data packet having a downstream header comprising a first source address and a first destination address, wherein a second data packet is an upstream data packet having an upstream header comprising a second source address and a second destination address, wherein the first source address is different from the second source address and the first destination address is different from the second destination address, wherein the first data packet and the second data packet belong to the same flow, and wherein the classifier unit selects a first packet processor of said packet processors to process the first data packet and the second data packet belonging to the same flow.

22. The network interface as claimed in claim 21, wherein the classifier unit instructs the first data path unit to output downstream data packets corresponding to the first flow to the first packet processor and instructs the second data path unit to output upstream data packets corresponding to the first flow to the first packet processor.

23. The network interface as claimed in claim 22, wherein, when the classifier unit first determines that a first data packet of the downstream data packets and the upstream data packets corresponds to the first flow, the classifier unit designates the first packet processor to process data packets corresponding to the first flow and instructs the first data packet to be output to the first packet processor.

24. The network interface as claimed in claim 23, wherein, after the classifier unit has designated the first packet processor to process data packets corresponding to the first flow, the classifier unit instructs the first data path unit to output the downstream data packets, which the classifier unit has determined to correspond to the first flow, to the first packet processor and instructs the second data path unit to output the upstream data packets, which the classifier unit has determined to correspond to the first flow, to the first packet processor.

25. The network interface as claimed in claim 24, further comprising:

a header processor coupled to the first data path unit and the second data path unit, wherein the header processor receives the downstream headers from the first data path unit, receives the upstream headers from the second data path unit, classifies the downstream data packets by comparing the downstream headers with predetermined rules, and classifies the upstream data packets by comparing the upstream headers with the predetermined rules.

26. The network interface as claimed in claim 25, wherein, when the header processor determines that a particular header of a particular downstream data packet received by the first data path unit corresponds to none of the predetermined rules, the header processor at least indirectly outputs a command to the classifier unit to instruct the classifier unit not to evaluate the particular header and not to determine a flow corresponding to the particular downstream data packet.

27. The network interface as claimed in claim 26, wherein, when the header processor determines that the particular header corresponds to none of the predetermined rules, the header processor at least indirectly outputs a command to the first data path unit to instruct the first data path unit to discard the particular downstream data packet.

28. The network interface as claimed in claim 22, wherein the first data path unit is capable of sorting the downstream data packets based on information contained in the downstream headers.

29. The network interface as claimed in claim 28, wherein said information contained in the downstream headers includes at least one IP address contained in each downstream header.

30. The network interface as claimed in claim 22, wherein the second data path unit is capable of sorting the upstream data packets based on information contained in the upstream headers.

31. The network interface as claimed in claim 30, wherein said information contained in the upstream headers includes at least one IP address contained in each upstream header.

32. The network interface as claimed in claim 22, further comprising:

a first FIFO unit that receives the data packets corresponding to the first flow and outputs the data packets corresponding to the first flow to the first packet processor.

33. The network interface as claimed in claim 22, wherein a parent data packet having a corresponding parent header is transmitted on the network and causes a child data packet having a corresponding child header to be transmitted on the network, wherein the parent data packet and the child data packet correspond to different flows, and wherein the classifier unit determines that the parent data packet and the child data packet correspond to the different flows but are related.

34. The network interface as claimed in claim 33, wherein the classifier unit causes the parent data packet and the child data packet to be output to the same one of the packet processors after determining that the parent data packet and the child data packet are related.

35. The network interface as claimed in claim 21, further comprising:

a header processor coupled to the first data path unit and the second data path unit, wherein the header processor receives the downstream headers from the first data path unit, receives the upstream headers from the second data path unit, classifies the downstream data packets by comparing the downstream headers with predetermined rules, and classifies the upstream data packets by comparing the upstream headers with the predetermined rules.

36. The network interface as claimed in claim 21, wherein, when the classifier inputs an initial packet header of an initial data packet corresponding to the first flow before the first packet processor has been selected to process both the upstream data packets and the downstream data packets corresponding to the first flow, the classifier evaluates first load information to determine a first load of the first packet processor and evaluates remaining load information to determine remaining loads of remaining ones of the packet processors, respectively, and wherein, when the classifier determines that first load is less than the remaining loads, the classifier at least indirectly causes the initial data packet to be output to the first packet processor.

37. The network interface as claimed in claim 15, wherein when at least one data packet of the upstream and downstream data packets corresponding to the first flow are output to the first packet processor, and wherein data type information is output to the first packet processor to inform the first packet processor of the type of data contained in the one data packet.

* * * * *